(12) United States Patent
Viviani (10) Patent No.: US 8,928,239 B1
(45) Date of Patent: Jan. 6, 2015

(54) DRIVING LEDS IN LCD BACKLIGHT (71) Applicant: Integrated Memory Logic International, Grand Cayman (KY)

(72) Inventor: Alberto Viviani, Mountain View, CA (US)

(73) Assignee: IML International, Grand Cayman (KY)

( * ) Notice: Subject to any disclaimer, the term of this patent is extended or adjusted under 35 U.S.C. 154(b) by 0 days.

(21) Appl. No.: 14/313,935

(22) Filed: Jun. 24, 2014

Related U.S. Application Data (63) Continuation of application No. 13/607,413, filed on Sep. 7, 2012, now Pat. No. 8,760,068.

(60) Provisional application No. 61/532,085, filed on Sep. 7, 2011.

(51) Int. Cl.
*H05B 37/02* (2006.01)
*H05B 33/08* (2006.01)

(52) U.S. Cl.
CPC .................................. *H05B 33/0815* (2013.01)
USPC ......................................... 315/224; 315/250

(58) Field of Classification Search
None
See application file for complete search history.

(56) References Cited

U.S. PATENT DOCUMENTS

| | | | |
|---|---|---|---|
| 5,959,413 A | 9/1999 | Komarek et al. | |
| 6,018,219 A | 1/2000 | Komarek et al. | |
| 7,888,881 B2 | 2/2011 | Shteynberg et al. | |
| 8,076,868 B2 | 12/2011 | Chien | |
| 8,217,583 B2 | 7/2012 | Wang et al. | |
| 8,334,659 B2 | 12/2012 | Aurongzeb et al. | |
| 2007/0024213 A1 | 2/2007 | Shteynberg et al. | |
| 2009/0322252 A1* | 12/2009 | Shiu et al. ...................... | 315/297 |
| 2010/0033110 A1 | 2/2010 | Chien | |
| 2010/0045650 A1 | 2/2010 | Fish et al. | |
| 2010/0201278 A1* | 8/2010 | Zhao .......................... | 315/185 R |
| 2011/0140626 A1 | 6/2011 | Aurongzeb et al. | |
| 2012/0019159 A1 | 1/2012 | Wang et al. | |

* cited by examiner

*Primary Examiner* — Crystal L Hammond
(74) *Attorney, Agent, or Firm* — Aka Chan LLP (57) ABSTRACT

A backlight driver includes current sources that are connected between LED strings and a number of bias voltages. There can be any number of different bias voltages, each at a ground potential or higher voltage. The bias voltage is selected for a particular LED string in order to reduce a current drop across the current source. This reduces the power consumption of the current source and LED string. Heat dissipation is also reduced.

20 Claims, 8 Drawing Sheets

Figure 12

DRIVING LEDS IN LCD BACKLIGHT

CROSS-REFERENCE TO RELATED APPLICATIONS

This patent application is a continuation of U.S. patent application Ser. No. 13/607,413, filed Sep. 7, 2012, issued as U.S. Pat. No. 8,760,068 on Jun. 24, 2014, which claims the benefit of U.S. provisional application 61/532,085, filed Sep. 7, 2011, which are incorporated by reference along with all other references cited in this application.

BACKGROUND OF THE INVENTION

This invention relates to the field of lighting, and more specifically to backlighting for a visual displays.

Electronic visual displays including televisions, monitors, panels, screens, and the like are used to display computer output, television, video, and other visual media. Some visual display technologies, such as liquid crystal or liquid crystal display (LCD), use a backlight in order to actively light the LCD panel display. LCDs are in use as computer monitors, televisions, tablet computers, projectors, smartphones, electronic picture frames, electronic signs, industrial equipment displays, medical device displays, and many other visual display uses.

Despite the widespread success of existing backlighting technology, there is a need for further improvements. These include lowering the cost, improving the performance characteristics (e.g., color temperature, white point, and others), reducing heat, and reducing power consumption.

Therefore, there is a need for improvements in the circuitry to drive a backlight of an LCD display.

BRIEF SUMMARY OF THE INVENTION

A backlight driver includes current sources that are connected between LED strings and a number of bias voltages. There can be any number of different bias voltages, each at a ground potential or higher voltage. The bias voltage is selected for a particular LED string in order to reduce a current drop across the current source. This reduces the power consumption of the current source and LED string. Heat dissipation is also reduced.

A system selects the voltage of the negative terminal of the current source of each string depending on the voltage drop on the string.

In other implementations, instead of current sources, the system uses other means to control the current through the strings (e.g. resistors, voltage sources, or controls directly the current in the power supply providing power to each string).

An implementation provides a fully integrated solution in which the circuitry resides on a single integrated circuit. However, in other implementations, the circuitry can be a discrete solutions or for solutions that use multiple integrated circuits (or chips).

An implementation includes a multiple-output single-inductor buck converter. However, other implementations includes other voltage generators including multiple bucks, linear regulators, current-sinking low-dropout regulators (LDOs), resistors, or other circuitry, and combinations of these.

Other implementations use other power supplies available in the system (e.g., logic supplies) even if these supplies are not variable, or when the system uses internally generated but fixed supplies.

In other implementations, the polarity of the devices can be reversed or partially reversed. For example, the current sources can be placed on the anode (positive terminal) of the LED string instead of at the cathode (negative terminal).

Although various implementations directed to backlighting as discussed, aspects of the invention can be applied to circuits and systems not involving backlighting. The circuits and techniques can be applied to white LEDs (WLEDs), but also to LEDs of different colors, not necessarily white. LEDs come in many colors including red, orange, yellow, green, blue, violet, infrared, and many others. For example, a single LED string can include LEDs of different colors. A system with a backlight driver of the invention can have multiple colors of LEDs (e.g., each string being a different color).

A positive voltage connected to an anode of the LED string can be supplied from an external source, internal source, boost converter, flyback, or other supply means.

In a specific implementation, a system includes: a first voltage input, second voltage input, and third voltage input; a first voltage generator circuit, connected to the first voltage input and generating a first voltage output, where the first voltage output is at a higher voltage level than the first voltage input; a first current source block including a first current source node, connected to the second end of the first plurality of light emitting diodes; a second current source block including a second current source node, connected to the fourth end of the first plurality of light emitting diodes; a first multiplexing block connected to the second and third voltage inputs, and a first multiplexing block output is connected to the first current source block; and a second multiplexing block connected to the second and third voltage inputs, and a second multiplexing block output is connected to the second current source block, where the voltage output and the first and second current source nodes are configured to be connected to a plurality of light emitting diodes.

A first set of light emitting diodes includes a first end connected to the voltage output and a second end connected to the first current source node. A second set of light emitting diodes includes a third end coupled to the voltage output and a fourth end connected to the second current source node.

In various implementations, the voltage generator circuit, first current source block, second current source block, first multiplexing block, and second multiplexing block reside on a single integrated circuit substrate. The voltage generator circuit, first current source block, second current source block, first multiplexing block, and second multiplexing block reside on a single integrated circuit substrate, and the first and second plurality of light emitting diodes do not reside on the same integrated circuit substrate where the voltage generator circuit, first current source block, second current source block, first multiplexing block, and second multiplexing block reside.

The system can include a first logic block connected to the first and second multiplexing blocks, where the first logic block controls selection of the first and second multiplexing blocks. The voltage generator circuit can include a boost converter circuit. A second voltage generator circuit is connected to the first voltage input and generates at least a second voltage output and a third voltage output, where the first voltage output is connected to the second voltage input, and the second voltage output is connected to the third voltage input. The second voltage generator circuit can include a buck converter circuit.

The system can include a second logic block including inputs connected to the first current source node and the second current source node, and a second logic block output connected to the first voltage generator circuit. A third logic block includes an input connected to the second logic block output, and a first output of the third logic block is connected to the second voltage input and a second output of the third logic block output is connected to the third voltage input. The first voltage input can be VDD, the second voltage input can be ground, and the second voltage is a voltage level between VDD and ground.

Some systems incorporating features of the invention can include televisions, monitors, panels, screens, flat panel display, LED panel, LCD panel, tablet computers, projectors, smartphones, electronic picture frames, electronic signs, industrial equipment displays, medical device displays, and many other visual displays.

In a specific implementation, A method includes: providing a first node to connect to a first set of light emitting diodes; providing a second node to connect to a second set of light emitting diodes; determining a first voltage drop across the first set of light emitting diodes; determining a second voltage drop across the second set of light emitting diodes; when the first voltage drop is greater than the second voltage drop, causing the first node to be at a ground voltage level and second node to be at a bias voltage level above ground; and when the second voltage drop is greater than the first voltage drop, causing the second node to be at a ground voltage level and first node to be at a bias voltage level above ground.

The first set of light emitting diodes can include at least two light emitting diodes coupled in series, as well as one or more light emitting diodes in parallel. The method can include providing a buck circuit to generate the bias voltage level. The method can include providing a third node to connect to the first and second sets of light emitting diodes; providing a boost circuit to generate a stepped-up voltage level; and causing the third node to be at the stepped-up voltage level.

In a specific implementation, a method includes: providing a first node to connect to a first set of light emitting diodes; providing a second node to connect to a second set of light emitting diodes; providing a third node to connect to a third set of light emitting diodes; determining a first voltage drop across the first set of light emitting diodes; determining a second voltage drop across the second set of light emitting diodes; determining a third voltage drop across the third set of light emitting diodes; when the first voltage drop is greater than the second and third voltage drops, causing the first node to be at a ground voltage level and second and third nodes to be at one or more voltage levels above ground; and when the second voltage drop is greater than the first and third voltage drops, causing the second node to be at the ground voltage level and first and third nodes to be at one or more voltage levels above ground.

The method can include: when the third voltage drop is greater than the first and second voltage drops, causing the third node to be at the ground voltage level and first and second nodes to be at one or more voltage levels above ground. The method can include: providing first circuitry to determine the first, second, and third voltage drops; and providing second circuitry to cause the first node to be at a ground voltage level and to cause the second node to be at a ground voltage level, where the first and second circuitry reside on an integrated circuit substrate that is separate from the first and second sets of light emitting diodes.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
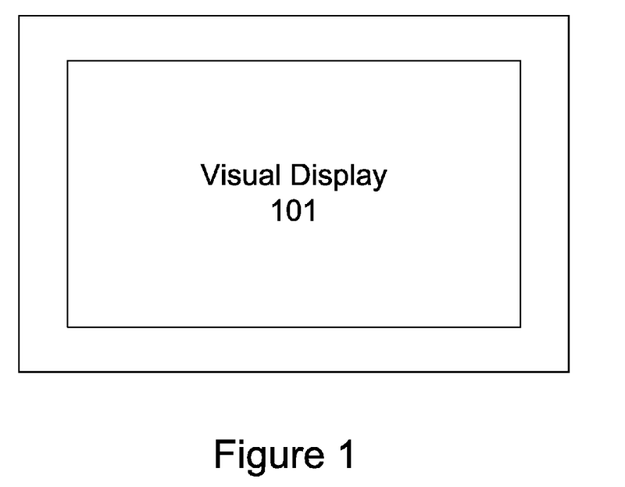
FIG. 1 shows an electronic visual display including a backlight circuit.

FIG. 1 shows an electronic visual display 101 which circuitry of the invention is used within. This patent application describes circuitry of the invention used within a backlight of a visual display. However the circuitry and aspects of the invention can be used and applied to other electronic systems.

Figure 2:
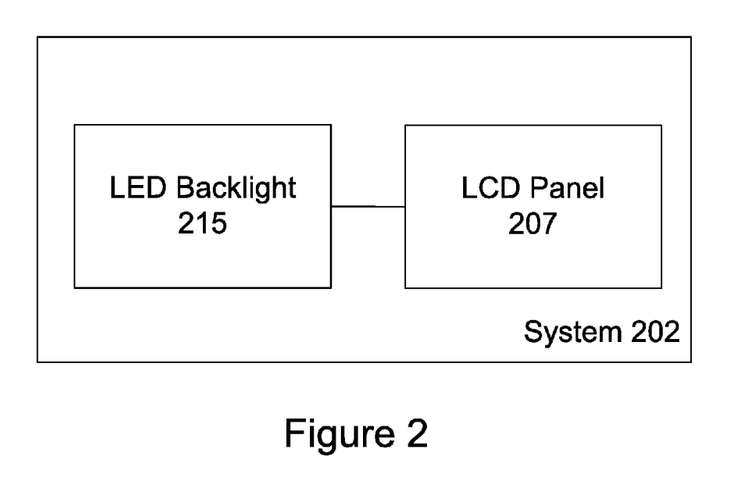
FIG. 2 shows a system having a backlight circuit and display panel.

FIG. 2 shows a block diagram of an electronic system 202, such as a visual display, which includes an LCD panel 207 and backlight 215. The lighting in this backlight includes light emitting diodes or LEDs. In many displays, the LCD panel is sandwiched together with the LED backlight. The LCD panel is on top or in front of the LED backlight. So, the light from the LED backlight shines through the LCD panel, lighting the display.

LEDs are a semiconductor light source. When a light-emitting diode is forward biased (switched on), electrons are able to recombine with electron holes within the device, releasing energy in the form of photons. This effect is called electroluminescence and the color of the light (corresponding to the energy of the photon) is determined by the energy gap of the semiconductor. LEDs are often small in area (less than 1 square millimeter), and integrated optical components may be used to shape its radiation pattern.

Although a backlight driver is described with respect to LED technology in this patent application, the principles and aspects of the invention can be applied to other lighting technologies. For example, instead of strings of LEDs, the circuity presented can be used with strings of other lighting technologies.

Figure 3:
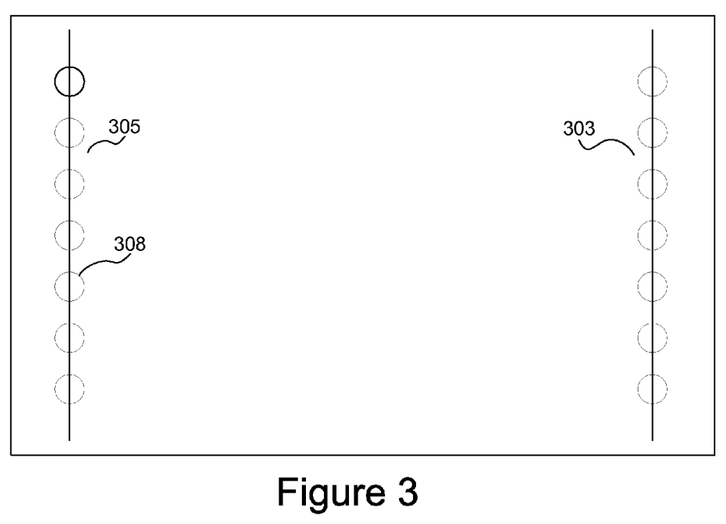
FIG. 3 shows an edge-lit backlight.

FIG. 3 shows an LED backlight with strings of LEDs 303 and 305 at two opposing edges of the backlight. This configuration may be called an edge-lit backlight. Each string has a plurality of LEDs 308. The backlight may include a light well or diffuser, or both, to distribute the light evenly.

The figure shows a string arranged in line. However, a string of LEDs can have any configures or positioned to have any desired orientation, such as circular, box, or other.

Figure 4:
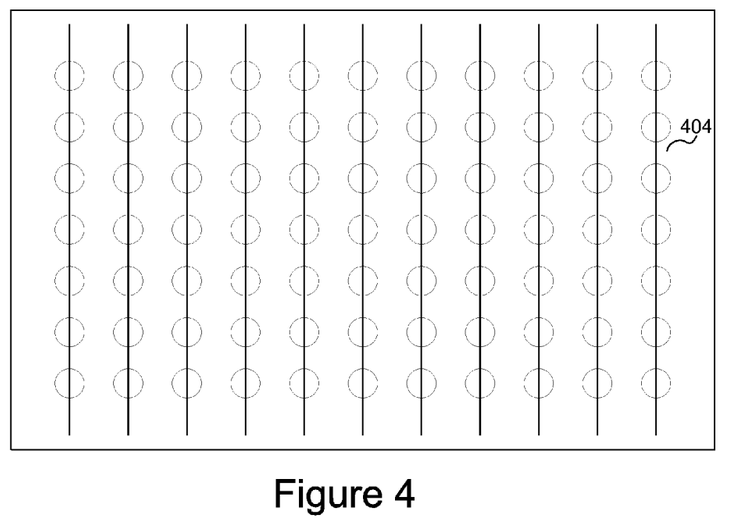
FIG. 4 shows a full array backlight.

FIG. 4 shows an LED backlight having an array of LED strings 404. A full array backlight can have any number of LED strings, and depends on the size of the display and desired brightness.

Figure 5:
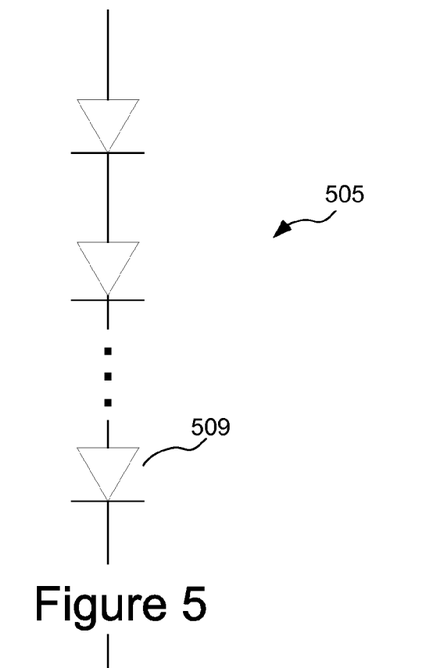
FIG. 5 shows a circuit schematic for a series configuration for an LED string.

FIG. 5 shows a circuit schematic of an LED string 505 with a plurality of LEDs 509, which are represented by diode symbols, connected in a series.

Figure 6:
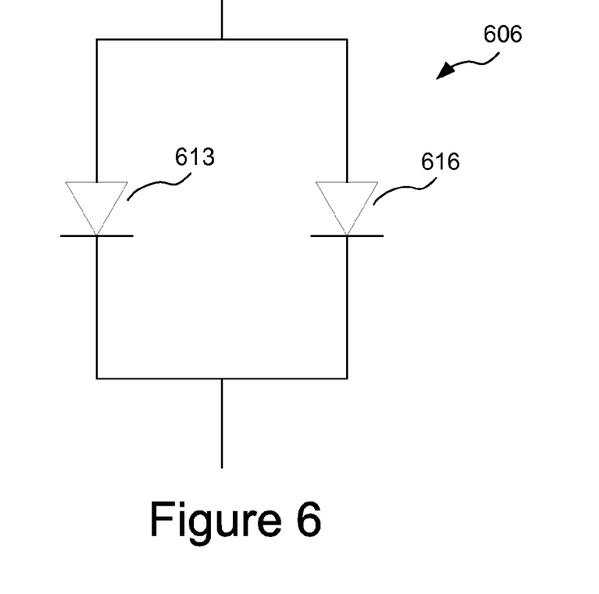
FIG. 6 shows a circuit schematic for a parallel configuration for an LED string.

FIG. 6 shows a circuit schematic of an LED string 606 with LEDs 613 and 616 connected in parallel. An LED string can include any number of LEDs in series or parallel, or any combination of series and parallel connection.

Figure 7:
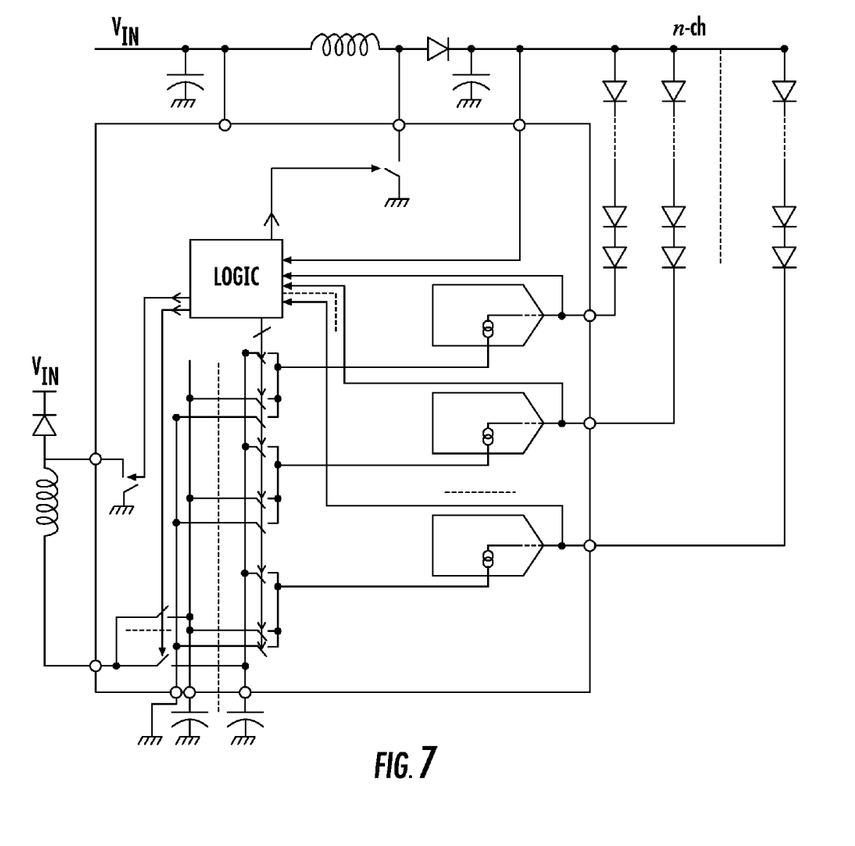
FIG. 7 shows a circuit schematic for a backlight driver.

FIG. 7 shows a circuit schematic of a backlight driver. The circuitry includes a number of LED strings, which are connected between a positive rail and current sources. More details are provided below.

Figure 8:
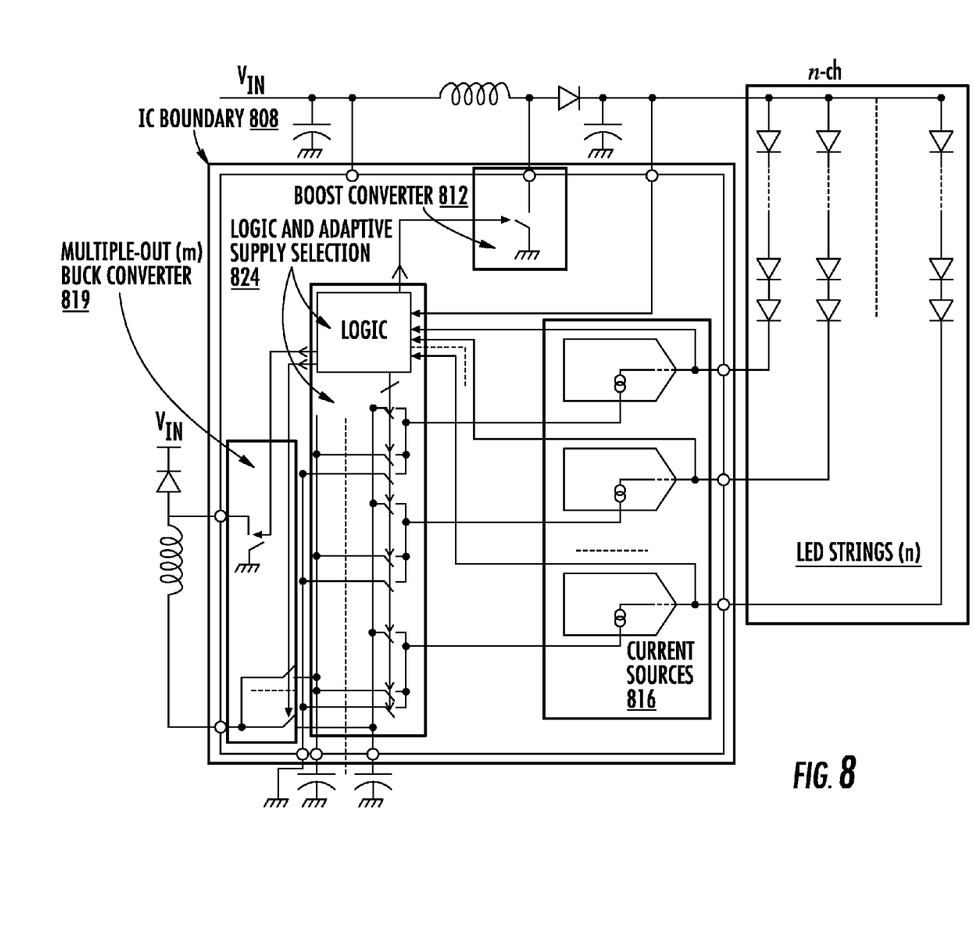
FIG. 8 shows a circuit schematic for a backlight driver with different sections identified.

FIG. 8 shows the circuitry of FIG. 7 with boxes identifying sections of the circuitry. An integrated circuitry boundary 808 is indicated. The circuitry within the boundaries of box 808 is fabricated on a single integrated circuit.

The backlight driver circuit includes a boost or step-up converter 812. A boost converter is a power converter to obtain an output DC voltage greater than its input DC voltage. The boost converter output is connected to a first end or positive end (e.g., anode for n-channel type LEDs) of the LED strings.

On a second end or negative end (e.g., cathode) of the LED strings, each LED strings is connected to a current source 816. Each current source is selectively connected to a voltage potential, ground, V1, or V2, or others. The voltages for the cathode (e.g., V1 or V2) can be generated using a buck converter 819. A buck converter is similar to a boost converter, but is a step-down DC-to-DC converter. The output DC voltage of a buck converter is less than its input DC voltage.

A logic and adaptive supply selection circuitry block 824 selects which voltage (e.g., ground, V1, or V2) to connect to a current source. In an implementation, a voltage to be connected to the current source is sufficiently low to keep the LEDs forward biased and on (or lighted), but sufficiently high (e.g., a voltage above ground) in order to reduce the voltage drop across the current source. This will reduce power consumption of the current source, and the string to which it is connected in series. Heat is also reduced.

Logic 824 is connected to the cathode nodes of each LED string. Logic 824 determines the minimum voltage at the cathode nodes. This string having the minimum voltage at its cathode will be the voltage having the greatest voltage drop across the string. The output of logic 824 is connected to the buck converter to adjust voltages which are connected to the current sources (e.g., ground, V1, or V2). This reduces current consumption of the strings.

In an implementation, the positive end of the LED strings (generated by the boost converter circuit) is connected to from about 40 volts to about 60 volts. There are typically from about 1 to about 16 LED strings.

Figure 9:
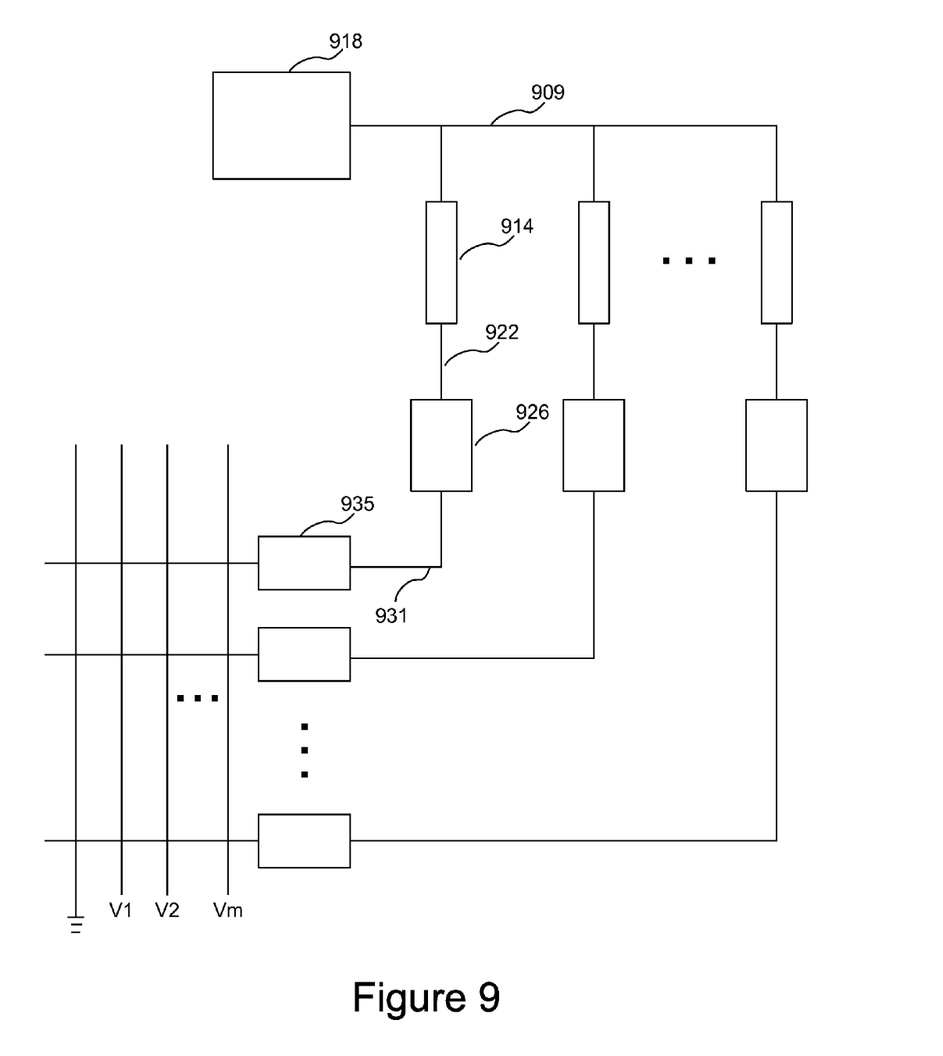
FIG. 9 shows a block diagram of a backlight circuit.

FIG. 9 shows a block diagram of backlight circuitry. An anode end 909 of LED strings 914 is connected to a voltage supply 918 (outputting a voltage VP). The voltage supply can be from an on-chip voltage supply, external voltage supply, boost converter circuit, or other. A cathode end 922 of the LEDs strings is connected to individual current sources 926. An end 931 of the current source is connected to an output of a multiplexer 935. Inputs to the multiplexers can be from any number of voltage inputs including ground, V1, and V2. The number of voltages can be labeled V1 to Vm, where m is an integer 1 or greater. Generally when are n strings of LEDs, there will be m different voltages for input to the multiplexers. The value of m will generally be less than n.

Figure 10:
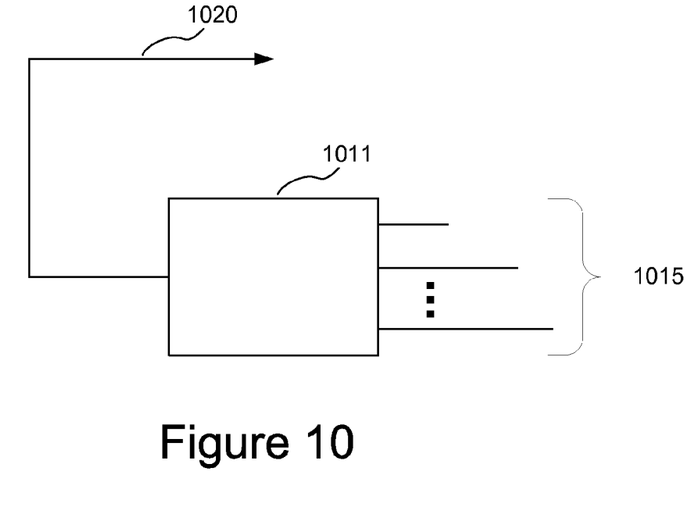
FIG. 10 shows a logical circuit to determine a minimum voltage level from a number on input nodes.

FIG. 10 shows logical circuitry block 1011 where inputs 1015 are connected to nodes 922 of the circuitry in FIG. 9. An output 1020 is connected to voltage supply 918 or a supply to generate voltages for nodes 931, or both.

In an implementation, the output of logical circuitry block 1011 gives a minimum voltage value by which an appropriate bias voltage Vbias (e.g., ground, V1, V2, or other) is connected through multiplexers 935 to node 922. This minimum voltage value is used to adjust the output of the voltage going to node 931 of the current source 926. In particular, for the LED string with lowest or minimum cathode voltage, this string has the greatest voltage drop across it. Then node 931 of the current source for this string is connected to ground, while current sources connected to other LED strings are connected to another higher voltage (e.g., bias voltage Vbias). This reduces power consumption, while still allowing the diodes of the string to light.

In an implementation, the output of logical circuitry block 1011 gives a minimum voltage value by which voltage supply 918 is adjusted. For example, the voltage output VP can be adjusted to be less positive. This also has the effect to reduce the power drop across the LED strings, thus lower power consumption.

In various implementations, output 1020 can be connected to control or adjust voltages at the anode or cathode of the strings, or both.

Figure 11:
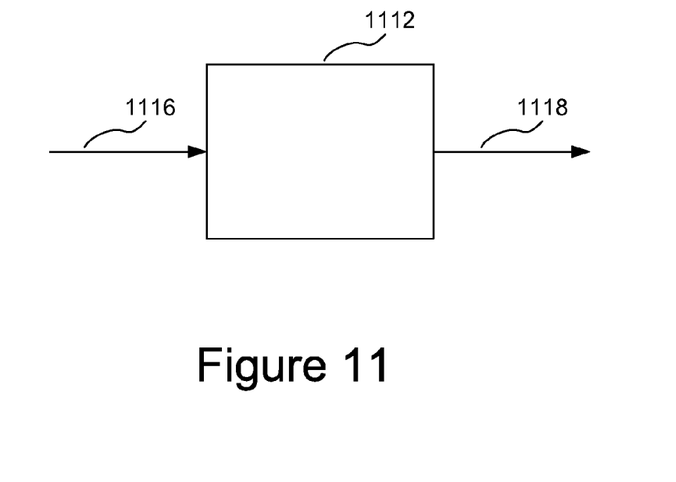
FIG. 11 shows a bias voltage generator circuit.

FIG. 11 shows a bias voltage generator circuit 1112 which takes an input voltage 1116 and generates one or more output voltages 1118. The output voltages are connected to V1, V2, V3, to Vm of multiplexer 935 of FIG. 9. In an implementation, the voltage generator circuit is a buck converter. In other implementations, the generator circuit is a boost converter, linear voltage converter, or other voltage generator circuitry.

Figure 12:
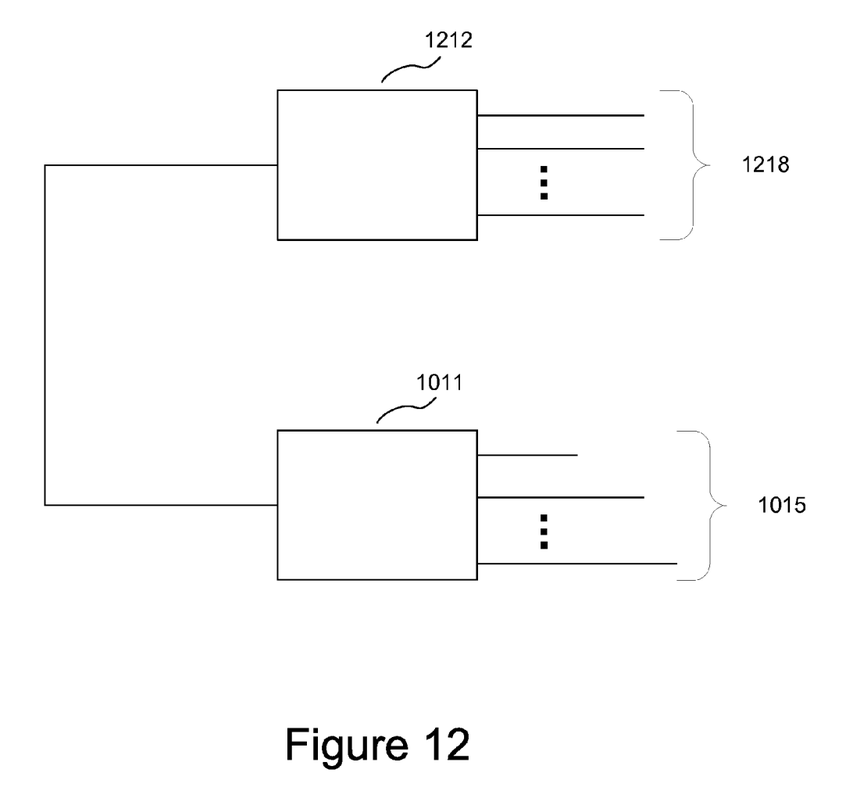
FIG. 12 shows a logical circuit to determine a minimum voltage level connected to a bias voltage generator circuit.

FIG. 12 shows a logical circuitry block 1011 as described for FIG. 10 with an output (e.g., minimum voltage value) that is connected to a voltage generator circuit 1212. At its output 1218, voltage generator circuit 1212 generates voltages (e.g., V1, V2, to Vm) for the inputs to the multiplexers 935.

LCD TV systems use backlight provided by white LEDs (WLEDs). The WLEDs are grouped in strings (series connection of several LEDs). Each string can contain up to about 30 WLEDs (typically 10-15) and a television can contain between 3 to about 12 strings. Each string has a bias current of typically from about 100 milliamps to about 300 milliamps and this current can be modulated using power width modulation (PWM). The typical power consumption of the WLED backlight is approximately 50 watts or more.

A problem of this system is that each WLED has a different forward voltage. As an example, typical WLED forward voltage for a given kind of LEDs can be 3.2 volts; however, each WLED of this kind can have forward voltages that ranges between 3.0 volts to 3.4 volts. String to string mismatch can be as high as 10 volts (e.g., 0.4 volts*25 LEDs in series). This would lead to an excess power dissipation of 1 watt per string. The excess power is dissipated in the current source that provides the bias for the LEDs.

To avoid (or limit) this issue, LEDs are "binned" for voltage. Binning refers to the process of screening or measuring each LED one by one, usually by a tester machine, and sorting the LEDs into different bins depending on their forward voltage and other performance characteristics. Typically this is done with 100 millivolts resolution and allows having string-to-string voltage mismatches of less than 2.5 volts. A drawback to binning that it is expensive, which leads to increased system costs. Binning takes time and resources to accomplish. Some LEDs will not be used. Therefore, the selected LEDs (e.g., "bin 1" LEDs) having the desired performance characters will each cost more.

A 2.5-volt string-to-string mismatch is still very large and creates a power consumption that cannot be taken by an integrated circuit. For this reason, the current sources in the WLED systems are made using external discrete devices (typically bipolar NPN transistors).

The circuitry in this patent can be used in a process to avoid binning of the LEDs and therefore reduce the cost of the system. Unbinned LEDs can be used in an LED backlight.

The unbinned LEDs will cost less than binned LEDs, since an LED manufacturer's cost is reduced by shortening or skipping the binning process.

This method can be used to drive current sources that are internal to the integrated circuit and therefore the bill of materials (BOM) is reduced as well.

In an implementation of the backlight driver, the current sources are "floating" (i.e., not directly attached to ground) and can be attached to different externally created voltages. In other implementations, the voltages can be created internally, such as using circuitry on the same integrated circuit.

Referring to FIG. 8, containing "n" strings, the voltages on the cathodes (negative terminals) of each strings are read and fed to a state machine (or microcontroller), labeled as "LOGIC." The LOGIC block determines the string with the largest voltage drop, connects the negative terminal of the current source of that string to ground, and adjusts the voltage of the boost converter in order to minimize the power loss on that string.

Subsequently, the LOGIC adjusts the "m" voltages generated by an external multiple-outputs buck converter (or by any other means), to minimize the total power consumption (based on the voltage of all the remaining strings). This is performed using an algorithm. LOGIC attaches negative terminal of each of the current sources of the remaining (n−1) strings to one of the m voltages generated as above. By appropriate selection of the external voltages, the typical total unwanted power consumption of the current sources can be reduced by more than 1/m.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A system comprising:
   a first voltage input, second voltage input, and third voltage input;
   a first voltage generator circuit, coupled to the first voltage input and generating a first voltage output, wherein the first voltage output is at a higher voltage level than the first voltage input;
   a first current source block comprising a first current source node, coupled to a first plurality of light emitting diodes;
   a second current source block comprising a second current source node, coupled to a second plurality of light emitting diodes;
   a first multiplexing block coupled to the second and third voltage inputs, and a first multiplexing block output is coupled to the first current source block; and
   a second multiplexing block coupled to the second and third voltage inputs, and a second multiplexing block output is coupled to the second current source block,
   wherein the first voltage output and the first current source node are configured to be coupled to the first plurality of light emitting diodes, and
   the first voltage output and the second current source node are configured to be coupled to the second plurality of light emitting diodes.

2. The system of claim 1 wherein the first plurality of light emitting diodes is coupled to the first voltage output, and the second plurality of light emitting diodes is coupled to the first voltage output.

3. The system of claim 1 wherein the first voltage generator circuit, first current source block, second current source block, first multiplexing block, and second multiplexing block reside on a single integrated circuit substrate.

4. The system of claim 2 wherein the first voltage generator circuit, first current source block, second current source block, first multiplexing block, and second multiplexing block reside on a single integrated circuit substrate, and
   the first and second plurality of light emitting diodes do not reside on the same integrated circuit substrate where the first voltage generator circuit, first current source block, second current source block, first multiplexing block, and second multiplexing block reside.

5. The system of claim 1 comprising:
   a first logic block coupled to the first and second multiplexing blocks, wherein the first logic block controls selection of the first and second multiplexing blocks.

6. The system of claim 1 wherein the first voltage generator circuit comprises a boost converter circuit.

7. The system of claim 1 comprising:
   a second voltage generator circuit, coupled to the first voltage input and generating at least a second voltage output and a third voltage output, wherein the first voltage output is coupled to the second voltage input, and the second voltage output is coupled to the third voltage input.

8. The system of claim 7 wherein the second voltage generator circuit comprises a buck converter circuit.

9. The system of claim 5 comprising:
   a second logic block comprising inputs coupled to the first current source node and the second current source node, and a second logic block output coupled to the first voltage generator circuit.

10. The system of claim 9 comprising:
    a third logic block comprising an input coupled to the second logic block output, and a first output of the third logic block coupled to the second voltage input and a second output of the third logic block output coupled to the third voltage input.

11. The system of claim 1 wherein the first voltage input is VDD, the second voltage input is ground, and the third voltage input is between VDD and ground.

12. A smartphone comprising the system of claim 1.

13. A television comprising the system of claim 1.

14. A method comprising:
    providing a first voltage input, second voltage input, and third voltage input;
    using the first voltage input, generating a first voltage output is at a higher voltage level than the first voltage input;
    coupling a first current source block to a first plurality of light emitting diodes;
    coupling a second current source block to a second plurality of light emitting diodes;
    selectively coupling the second or third voltage inputs to the first current source block; and
    selectively coupling the second or third voltage inputs to the second current source block.

15. The method of claim 14 comprising:
    coupling the first voltage output to the first plurality of light emitting diodes; and
    coupling the first voltage output to the second plurality of light emitting diodes.

16. The method of claim 14 comprising:

coupling the first plurality of light emitting diodes between the first voltage output and the first current source block; and coupling the second plurality of light emitting diodes between the first voltage output and the second current source block.

17. The method of claim 14 comprising:

using the first voltage input, generating at least a second voltage output and a third voltage output;

coupling the first voltage output to the second voltage input; and coupled the second voltage output to the third voltage input.

18. The method of claim 14 wherein the first voltage input is VDD, the second voltage input is ground, and the third voltage input is between VDD and ground.

19. A system comprising:

a first voltage input, second voltage input, and third voltage input;

a first voltage generator circuit, coupled to the first voltage input and generating a first voltage output, wherein the first voltage output is at a higher voltage level than the first voltage input;

a first current source block comprising a first current source node, coupled to a first plurality of light emitting diodes; and a first multiplexing block coupled to the second and third voltage inputs, and a first multiplexing block output is coupled to the first current source block.

20. The system of claim 19 comprising:

a second current source block comprising a second current source node, coupled to a second plurality of light emitting diodes; and a second multiplexing block coupled to the second and third voltage inputs, and a second multiplexing block output is coupled to the second current source block.

* * * * *